Patented Dec. 12, 1933

1,938,827

UNITED STATES PATENT OFFICE 1,938,827

METHOD FOR THE PRODUCTION OF STYROLS FROM ALKYL BENZOL

Willis A. Gibbons, Montclair, and Omar H. Smith, West Englewood, N. J., assignors to The Naugatuck Chemical Company, Naugatuck, Conn., a corporation of Connecticut No Drawing. Application January 26, 1932
Serial No. 589,042

11 Claims. (Cl. 260—168)

Ethyl benzol has been subjected to pyrogenic dehydrogenation at temperatures in the vicinity of 500-700° C. It has also been proposed to carry out such dehydrogenation in the presence of inert gases such as nitrogen and carbon dioxide. The reaction which takes place causes the ethyl benzol to lose hydrogen and thereby to produce styrol. The reaction, however, is reversible, depending upon the temperature, the concentration of styrol in the reaction products, and upon the presence of catalysts or catalytic material such as those which might constitute the reaction furnace. In other words, there is in this reaction, whether it be carried out with ethyl benzol alone or in the presence of inert gases, a tendency for the hydrogen to recombine at least in part with the styrol to form ethyl benzol. The result of this is of course to reduce the yield of styrol. Furthermore, other hydrocarbons are formed during the dehydrogenation process and some of these tend to combine with the styrol.

According to the present invention, the pyrogenic dehydrogenation of ethyl benzol is carried out in the presence of material which disturbs the equilibrium of the reaction in such a manner as to increase the yield of styrol and to prevent or to minimize any tendency of the hydrogen or other hydrocarbons to recombine with the styrol. The present invention offers therefore a means of increasing the yield of styrol so obtained and at the same time decreases subsequent manufacturing operations in that it permits the recovery of a more concentrated styrol solution, which can be polymerized with greater ease than a more dilute solution. Hence the present invention furnishes a process whereby both productivity and efficiency are increased.

The objects of the invention are therefore to provide a method for increasing the yield of styrol obtained by the pyrogenic dehydrogenation of alkyl benzol, to increase the concentration of styrol in the reaction products thus obtained, to carry out the dehydrogenation of alkyl benzol in the presence of substances which favorably influence the reaction and minimize the reversibility of said reaction, and in short to increase both productivity and efficiency of the pyrogenic dehydrogenation of alkyl benzol to form styrol. Another object is to dehydrogenate alkyl benzol by treating it in the presence of a properly constituted dehydrogenating material.

A dehydrogenating compound may be described as a compound which reacts continuously with the hydrogen released during a cracking operation, thus reducing the quantity of free hydrogen in the cracking tube, and which may also reduce the partial pressure of the ethyl benzol. In other words a dehydrogenating compound favorably influences the process by chemical or by both chemical and physical means. An inert compound or substance exerts no chemical effect whatever, and any benefit derived from dehydrogenating in the presence of an inert gas must be ascribed purely to the physical effect of reducing the partial pressure of the ethyl benzol. An inert gas may be used to advantage with a dehydrogenating compound which does not generate enough gas to lower the partial pressure of the ethyl benzol to a sufficient degree to secure maximum efficiency in the reaction. The term "productivity" used herein designates the percentage relationship between the styrol produced and the ethyl benzoyl passed through the cracking furnace. The term "efficiency" designates the percentage relationship between the styrol produced and the ethyl benzol consumed during the dehydrogenation. (Ethyl benzol consumed is the difference between the ethyl benzol passed through the tube and the ethyl benzol recovered.) The productivity, efficiency and concentration of styrol in the steam distillate are all of importance for the best results with the process. Inert gases exert a favorable influence on efficiency but have only a moderate effect on productivity and concentration. On the other hand, the dehydrogenating compounds which react chemically readily give high concentrations of styrol.

With a particular embodiment in mind but without intention to place limitations upon the scope of the invention beyond what may be required by the prior art, the invention briefly consists in subjecting an alkyl benzol, such as ethyl benzol or other alkyl benzols having at least two carbon atoms in an aliphatic side chain, to heat to thereby split the alkyl benzol into a styrol and hydrogen, the heating being carried out in the presence of a halogen, or in the presence of a halogen containing compound capable of giving up its halogen under the reaction conditions, so that the halogen may combine continuously with the hydrogen set free to form a stable product under the reaction conditions.

The present application is a continuation in part of our copending application Serial No. 224,020, filed October 4, 1927.

The dehydrogenation may be carried out in a tube furnace, using a chromel tube heated electrically or in any other suitable way. While an iron tube may be used, it is corroded by the ingredients of the reaction mixture, and therefore it is preferred to use a material which will be unaffected by them. Other accessory apparatus includes a container for the ethyl benzol, temperature measuring device, the usual flow meters, pressure recording instruments, condensers, receivers, etc. No especial type of apparatus is required, but the customary cracking furnaces as employed in such reactions serve quite well. In the following illustrations an electrically heated chromel tube furnace, three feet long and three-quarters inch inside diameter has been employed, except in two instances where an iron tube was used. The rate of flow of ethyl benzol into the furnace is approximately 100 grams per hour for this size of tube. The temperature in the tube in the reaction zone is preferably 675-720° C. The amount of added material is based upon the amount of ethyl benzol supplied to the furnace.

| Added material | Reaction tube chromel or iron | Temp. | Percent styrol in steam dist. | Productivity | Efficiency |
|---|---|---|---|---|---|
| None | Chromel | 675 | 24.0 | 18.2 | 27.0 |
| None | Iron | 700 | 32.3 | 22.4 | 30.0 |
| None | Chromel | 725 | 26.3 | 14.9 | 18.0 |
| 10 carbon tetrachloride | Iron | 700 | 41.0 | 28.8 | 35.4 |
| 4 chlorine | Chromel | 675 | 34.5 | 25.8 | 35.2 |
| 8 chlorine | Chromel | 700 | 38.0 | 28.6 | 39.0 |
| 13 chlorine | Chromel | 700 | 41.6 | 34.8 | 51.7 |
| 7 ethylene chloride | Chromel | 700 | 37.6 | 31.3 | 48.9 |
| 14 ethylene chloride | Chromel | 700 | 44.0 | 30.7 | 38.5 |

By comparison with the three examples in which no ingredient was added, it will be seen that in every case where chlorine or a chlorine compound was added there was a marked increase in productivity, efficiency and per cent of styrol in the steam distillate, and in many cases the increase in one or more of these was very large.

In the above table, the values shown are comparative for the size of the reaction tube used. The same general order of improvement, however, extends to manufacturing conditions, and the above values may therefore be used as a guide in manufacture.

As before pointed out, gases, such as nitrogen and carbon dioxide, have been previously used in the cracking of ethyl benzol, and increase the productivity and efficiency but are inert chemically and are substantially without effect upon the percentage of styrol in the distillate. They function purely through their effect upon the partial pressure. Ammonia also appears to influence the reaction in the same way as carbon dioxide and nitrogen. However, materials which have a definite chemical effect bring about an increase in the percentage of styrol in the steam distillate, and this increase is of great importance in manufacturing. Styrol, unless polymerized by special procedures, in general produces a brittle polymer of little commercial value. On the other hand, when polymerized to a tough polymer, a valuable product is produced having many properties of great importance in the arts. One of the preferred methods for polymerizing styrol to obtain the tough polymer is to polymerize it in solution in a suitable solvent, for instance, ethyl benzol. However, in order to properly carry out such a polymerizing process, the solution should have a styrol concentration of about 40% or higher. Therefore, when styrol is produced in a solution of less concentration, it is necessary to bring the concentration up to the desired degree by distillation, and in such distillation there is an undesirable loss of styrol during the process. Hence, it is of the greatest importance in the production of styrol, to initially obtain a styrol solution of as nearly the desired concentration as possible. In the examples given it will be seen that in three cases the styrol from the steam distillate is already in excess of 40% and in no case is it below 34.5%.

When the cracking operation upon ethyl benzol is carried out in the presence of chlorine gas, the chlorine continuously reacts chemically upon the hydrogen set free to form hydrochloric acid gas. Carbon tetrachloride also reacts chemically, forming hydrochloric acid gas. Ethylene chloride acts chemically and also physically, forming hydrochloric acid and vinyl chloride, and this last mentioned product probably reacts with free hydrogen to form ethyl chloride.

In addition to the substances already named, many other halogen compounds give very good results, among which may be named chloroform, trichlor-ethane, tetra-chlor-ethane, hexa-chlor-ethane, and ethyl chloride. Bromine and bromine compounds also give good results, and among the latter may be named bromoform, tri-brom-ethane, tetra-brom-ethane, hexa-brom-ethane, ethyl bromide, ethylene bromide and carbon tetra bromide.

It may thus be seen that a wide range of halogens and halogen containing materials may be employed. The manufacture of a styrol by splitting an alkyl benzol into a styrol and hydrogen by heat can be greatly facilitated by the use of the materials disclosed in the present application, the materials chemically combining with certain of the reaction by-products and in some cases also having the physical effect of reducing the partial pressure of the alkyl benzol.

While the invention has been illustrated with ethyl benzol as the raw material, it is understood that the process of the invention may be applied to homologues of styrol, such as described in patent to Ostromislensky No. 1,683,402, September 4, 1928, and in its broad aspect the invention comprehends the use of such equivalent materials. These styrol homologues may be made from alkyl benzols such as described in patents to Ostromislensky et al. Nos. 1,552,874 and 1,552,875.

Having thus described our invention, what we claim and desire to protect by Letters Patent, is:

1. Method of producing a styrol from an alkyl benzol having at least two carbon atoms in an aliphatic side chain which comprises splitting it into a styrol and hydrogen by heat in the presence of volatile sulphur-free material comprising a halogen having an atomic weight between 35 and 80, continuously combining halogen therefrom with the hydrogen evolved to form a stable compound under the reaction conditions, and separating the styrol from the reaction products.

2. Method of producing a styrol from an alkyl benzol having at least two carbon atoms in an aliphatic side chain which comprises splitting it into a styrol and hydrogen by heating to not substantially below 675° C. in the presence of volatile sulphur-free material comprising a halogen having an atomic weight between 35 and 80, continuously combining halogen therefrom with the hydrogen evolved to form a stable compound under the reaction conditions, and separating the styrol from the reaction products.

3. Method of producing a styrol from an alkyl benzol having at least two carbon atoms in an aliphatic side chain which comprises splitting it into a styrol and hydrogen by heating to not substantially above 720° C. in the presence of volatile sulphur-free material comprising a halogen having an atomic weight between 35 and 80, cotinuously combining halogen therefrom with the hydrogen evolved to form a stable compound under the reaction conditions, and separating the styrol from the reaction products.

4. Method of producing a styrol from an alkyl benzol having at least two carbon atoms in an aliphatic side chain which comprises splitting it into a styrol and hydrogen by heating to approximately 675°–720° C. in the presence of volatile sulphur-free material comprising a halogen having an atomic weight between 35 and 80, continuously combining halogen therefrom with the hydrogen evolved to form a stable compound under the reaction conditions, and separating the styrol from the reaction products.

5. Method of producing a styrol from an alkyl benzol having at least two carbon atoms in an aliphatic side chain which comprises splitting it into a styrol and hydrogen by heat, in the presence of volatile sulphur-free material comprising an organic compound of a halogen having an atomic weight between 35 and 80, continuously combining halogen from said compound with the hydrogen evolved to form a stable compound under the reaction conditions, and separating the styrol from the reaction products.

6. Method of producing a styrol from an alkyl benzol having at least two carbon atoms in an aliphatic side chain which comprises splitting alkyl benzol into a styrol and hydrogen by heating to not substantially below 675° C., continuously combining the hydrogen evolved with halogen from sulphur-free material comprising an ingredient selected from the group consisting of chlorine, chloroform, carbon tetrachloride, ethyl chloride, tri-chlor-ethane, tetra-chlor-ethane, hexa-chlor-ethane, ethylene chloride, bromine, bromoform, carbon tetra-bromide, ethyl bromide, tri-brom-ethane, tetra-brom-ethane, hexa-brom-ethane, and ethylene bromide, and separating the styrol from the reaction products.

7. Method of producing a styrol from an alkyl benzol having at least two carbon atoms in an aliphatic side chain which comprises splitting alkyl benzol into a styrol and hydrogen by heating to not substantially above 720° C., continuously combining the hydrogen evolved with halogen from sulphur-free material comprising an ingredient selected from the group consisting of chlorine, chloroform, carbon tetrachloride, ethyl chloride, tri-chlor-ethane, tetra-chlor-ethane, hexa-chlor-ethane, ethylene chloride, bromine, bromoform, carbon tetra-bromide, ethyl bromide, tri-brom-ethane, tetra-brom-ethane, hexa-brom-ethane, and ethylene bromide, and separating the styrol from the reaction products.

8. Method of producing styrol from ethyl benzol which comprises splitting ethyl benzol into styrol and hydrogen by heat in the presence of volatile sulphur-free material comprising a halogen having an atomic weight between 35 and 80, continuously combining halogen therefrom with the hydrogen evolved to form a stable compound under the reaction conditions, and separating the styrol from the reaction products.

9. Method of producing styrol from ethyl benzol which comprises splitting ethyl benzol into styrol and hydrogen by heating to not substantially below 675° C. in the presence of volatile sulphur-free material comprising a halogen having an atomic weight between 35 and 80, continuously combining halogen therefrom with the hydrogen evolved to form a stable compound under the reaction conditions, and separating the styrol from the reaction products.

10. Method of producing styrol which comprises splitting ethyl benzol into styrol and hydrogen by heating at approximately 675°–720° C., combining the hydrogen with halogen from sulphur-free material comprising an ingredient selected from the group consisting of chlorine, chloroform, carbon tetra-chloride, ethyl chloride, tri-chlor-ethane, tetra-chlor-ethane, hexa-chlor-ethane, ethylene chloride, bromine, bromoform, carbon tetrabromide, ethyl bromide, tri-brom-ethane, tetra-brom-ethane, hexa-brom-ethane, and ethylene bromide, and separating the styrol from the reaction products.

11. The method of producing a styrol from an alkyl benzol having at least two carbon atoms in an aliphatic side chain, which comprises continuously passing a mixture comprising the alkyl benzol and a volatile sulphur-free halogen-containing material through a reaction zone heated to a temperature of 675–720° C., continuously removing the reaction mixture from the reaction zone, and separating a styrol therefrom.

WILLIS A. GIBBONS.
OMAR H. SMITH.